US006946018B2

(12) United States Patent
Hogan

(10) Patent No.: US 6,946,018 B2
(45) Date of Patent: Sep. 20, 2005

(54) METHOD AND APPARATUS FOR CLEANING A GAS

(76) Inventor: J. S. Hogan, 1742 Country Club Dr., Sugar Land, TX (US) 77478-3906

( * ) Notice: Subject to any disclaimer, the term of this patent is extended or adjusted under 35 U.S.C. 154(b) by 0 days.

(21) Appl. No.: 10/990,182

(22) Filed: Nov. 16, 2004

(65) Prior Publication Data

US 2005/0061154 A1 Mar. 24, 2005

Related U.S. Application Data

(63) Continuation-in-part of application No. 10/601,930, filed on Jun. 23, 2003, now Pat. No. 6,899,750, which is a continuation-in-part of application No. 10/229,853, filed on Aug. 28, 2002, now Pat. No. 6,764,531, which is a continuation-in-part of application No. 10/085,830, filed on Feb. 28, 2002, now Pat. No. 6,485,548, which is a continuation of application No. 09/900,828, filed on Jul. 6, 2001, now Pat. No. 6,391,100.

(51) Int. Cl.$^7$ .............................................. B01D 47/16
(52) U.S. Cl. ............................. 95/187; 96/269; 96/272; 96/282; 96/285; 96/286; 261/88
(58) Field of Search ......................... 95/187, 216, 218; 261/88; 96/268, 269, 272, 278, 281, 282, 285, 286, 322

(56) References Cited

U.S. PATENT DOCUMENTS

| 494,264   | A | * | 3/1893  | Seymour, Jr. ............... | 96/285 |
|-----------|---|---|---------|------------------------------|--------|
| 1,408,736 | A | * | 3/1922  | Hernu ......................... | 96/282 |
| 3,253,819 | A | * | 5/1966  | Butterfield ................... | 261/25 |
| 3,336,733 | A | * | 8/1967  | Wisting ....................... | 96/235 |
| 3,701,237 | A | * | 10/1972 | Smuck ........................ | 96/285 |
| 4,102,658 | A | * | 7/1978  | Jarvenpaa .................... | 96/284 |
| 4,443,389 | A | * | 4/1984  | Dodds ........................ | 261/153 |
| 4,594,081 | A | * | 6/1986  | Kroll et al. ................... | 96/235 |

* cited by examiner

Primary Examiner—Frank M. Lawrence
(74) Attorney, Agent, or Firm—Winstead Sechrest & Minick; Henry L. Ehrlich

(57) ABSTRACT

A method and apparatus for cleaning a gas comprising a rotatable centrifugal cylinder having passageways for flowing a gas stream with a liquid stream through the cylinder to centrifugally remove the particulates from the gas stream with the liquid stream; turbine blades positioned inside the cylinder and connected to the cylinder to rotate the cylinder when the liquid stream flows through the turbine blades; fan blades positioned inside the cylinder and connected to the cylinder to rotate with the cylinder to pump the gas stream through the cylinder; and a pump connected to a reservoir of liquid, for pumping the liquid stream.

26 Claims, 12 Drawing Sheets

US 6,946,018 B2

METHOD AND APPARATUS FOR CLEANING A GAS

RELATED APPLICATIONS

This application is a continuation-in-part of and claims benefit of priority of U.S. patent applications Ser. No. 10/601,930, filed 23 Jun., 2003, entitled Method and Apparatus for Cleaning a Gas, now U.S. Pat. No. 6,899,750 which is a continuation-in-part of Ser. No. 10/229,853, filed 28 Aug. 2002, entitled Method and Apparatus for Cleaning Gas, issued 20 Jul. 2004 as U.S. Pat. No. 6,764,531, which is a continuation-in-part of Ser. No. 10/085,830, filed 28 Feb. 2002, entitled Method and Apparatus for Cleaning Gas, issued 26 Nov. 2002 as U.S. Pat. No. 6,485,548, which is a continuation of Ser. No. 09/900,828, filed 6 Jul. 2001, entitled Method and Apparatus for Cleaning Gas, issued 1 May 2002 as U.S. Pat. No. 6,391,100, all of which are incorporated reference herein.

FIELD OF THE INVENTION

The present invention relates to the field of cleaning a gas, and more specifically to a method and apparatus for removing particulate from and absorbing selected gases from a gas stream by mixing a gas stream with a liquid stream to wet the particulates and absorb the selected gases to discharge a cleaned gas.

BACKGROUND

It is very often desirable to clean a gas stream of particulates and/or undesirable gases. It is sometimes desirable to remove particulates or selective gases for capture or disposal from a gas stream by absorption or mixing with a liquid. It is also becoming more desirable and popular to clean air in domestic settings, particularly the removal of spores, bacteria, and viruses due to the current biological threats by terrorists. Other domestic pollutants include, but are not limited to, auto emissions, smoke, allergens such as pollen, mites, pet dandruff, hair and dead skin and dust, and gases such as carbon dioxide, ozone, carbon monoxide and odors.

Several methods are currently used to clean or partially clean gases such as air in a domestic setting. Some of the most common methods of "cleaning air" are the utilization of filter systems, electrostatic devices, and venturi scrubbers which are less economical than the present invention.

Viruses, bacteria, spores, small particulate and some small insects such as some small baby spiders, often float in air currents and can even circle the earth. It is said that such minute living beings can travel to outer space and live for over one thousand years, even though exposed to extreme temperatures and radiation. Also, high levels of ozone in the air that we breathe causes breathing problems, especially in the elderly, children, and people with impaired lungs. The oxygen molecule has two atoms of oxygen and the ozone molecule has three oxygen atoms. The third oxygen atom in an ozone molecule makes the ozone molecule an extremely reactive radical molecule and, when breathed, it reacts with body parts and destroys them. Such pollution in the air that we breath is said to be deadly, to shorten lives, and to lead to lung cancer and other serious health effects. It is therefore not reasonable to assume that the gravitational force of only one gravity can totally and efficiently remove such small pollutants from the domestic air that we breathe in a reasonable time period, and accordingly, it is generally considered that there are more pollutants in the home than outside the home. Yet, it is very easy to provide a high centrifugal force with air at the surface of a flowing liquid, and to impact the surface of such flowing liquid with the air at a high velocity to mix and remove the undesirable elements from the air.

It is a desire to provide an improved and more economical method and apparatus for removing particulates and selected gases from a gas stream by flowing and impacting the liquid face of a stream of flowing liquid at a high velocity and centrifugal force with the gas stream. It is a further desire to convey a stream of gas through a stream of liquid at a high velocity to mix the gas and liquid and to remove the undesirable parts from the gas by absorption with the liquid. It is a still further desire to centrifugally remove retained liquids, wetted particulates, and heavier parts from the gas stream by flowing the gas stream at a high rotational rate through a cyclone.

SUMMARY OF THE INVENTION

In view of the foregoing and other considerations, the present invention relates to a method and apparatus for scrubbing a gas.

Accordingly, a method and apparatus for cleaning a gas is provided. The apparatus includes a rotatable centrifugal cylinder having passageways for flowing a gas stream with a liquid stream through the cylinder to centrifugally remove the particulates from the gas stream with the liquid stream, turbine blades positioned inside the cylinder and connected to the cylinder to rotate the cylinder when the liquid stream flows through the turbine blades, fan blades positioned inside the cylinder and connected to the cylinder to rotate with the cylinder to pump the gas stream through the cylinder and a pump, connected to a reservoir of liquid, for pumping the liquid stream.

Several embodiments of a system and method of cleansing a gas of undesired particulate, aromas, and gases of the type utilizing a liquid to wet the particulate and absorb selected gases from a gas stream are provided. A rotatable cylinder, may be mounted in a vertical position, is provided to allow a liquid stream to flow centrifugally down and around the inside wall of the cylinder with a high velocity stream of gas to impact and centrifugally force the heavier particles in the gas to mix with the liquid and separate from the gas. The gas scrubber of the present invention may include a circular container, having a top circular outlet opening and a side wall with a bottom wall for providing a liquid reservoir therein having a surface positioned above the bottom wall that provides a space between the surface and the top opening.

The bottom wall is positioned above the floor level, to provide a passageway between the bottom wall and the floor. The bottom wall may form a centrally positioned opening in communication with a vertically mounted circular gas conduit that extends through the liquid reservoir and above the surface to allow the flow of gas from below the bottom wall and through the gas conduit from the bottom inlet end to the top outlet end that is positioned above the liquid surface. A rotatable circular disk may be positioned above the outlet of the gas conduit and mounted on a rod. The gas inlet may be positioned to the side or above the disk as well. The disk may be attached to the conduit to rotate around the rod and the conduit outlet. Fan blades may be attached to the bottom of the disk and positioned above the conduit outlet to draw the gas through the conduit and to accelerate the gas at a high velocity off of the fan blades. A cone shaped circular cylinder may be attached to the outside rim of the disk to rotate therewith. The bottom outlet end of the cylinder, larger then the top inlet end, is positioned below the conduit outlet, and above the liquid surface, to allow the gas departing the fan blades to impact the inside wall of the cylinder, which has a flowing liquid face, at a high velocity and centrifugal force, and to allow the gas to flow out the bottom of the cylinder, through the container in a circular rotational direction, and out the container opening. The top end of the cone shaped cylinder is positioned above the top side of the disk. Turbine blades may be attached to the top side of the disk to rotate the disk. A pump is provided having an inlet in fluid communication with the liquid reservoir, and an outlet positioned adjacent the turbine blades to flow a stream of the liquid to the turbine blades to rotate the disk. The outside rim of the disk may be perforated with holes, positioned between the inside wall of the cone cylinder and the outside of the disk rim, to allow the liquid to flow off the turbine blades and to gravitate to and through the holes, down the inside bottom wall of the cylinder forming the liquid face, out the bottom outlet end of the cylinder, and back to the liquid reservoir. Since the liquid is propelled by centrifugal force horizontally out of the cylinder outlet, the gas flows up and through the liquid stream and further mixes with the liquid. The gas then flows in a circular manner around the inside of the side wall, as in a cyclone, and out the container outlet opening.

In operation, gas is drawn through an inlet conduit by rotating fan blades and tangentially departs the fan blades into a rotating cylinder encircling the inlet conduit, and then flowing down the rotating cylinder and out the bottom opening of the rotating cylinder which is located above the surface of a liquid held by an outside container encircling the rotating cylinder. The gas then flows in a circular manner upward through the outside container and out the top outlet of the outside container. Liquid is pumped from the reservoir to turbine blades, that are attached to the top side of a disk that is mounted on a rod supported by the conduit, to rotate the disk. The fan blades, turbine blades, and rotating cylinder are all attached to the disk to rotate therewith. The same blade may form the turbine blades and the fan blades. The outside rim of the disk is provided with passageways to allow the liquid to gravitate through the passageways and down the inside wall of the cylinder and out the cylinder outlet to the reservoir. Particulates and heavier material are separated from the gas: 1) when it impacts the wetted inside wall of the cylinder at a high velocity; 2) by centrifugal force as the gas flows down the inside wall of the cylinder; 3) when it flows through the liquid stream departing the outlet of the cylinder; and 4) by centrifugal force as the gas flows in a circular manner up and out the outside container top outlet.

The present invention has many benefits including the ability to clean a gas stream by wetting it with a liquid by utilizing a combination of forces, such as: impacting the surface of a flowing liquid stream with the stream of gas to be cleaned, centrifugally subjecting the gas stream to a very high gravitational force to cause heavier particulates and molecules to gravitate out and mix with a flowing liquid stream, flowing the gas at a high velocity through a flowing stream of liquid and applying additional centrifugal force to the scrubbed stream of gas.

The same blades may serve as both the fan blades and the turbine blades. Additionally, the same inlet may serve as the gas inlet and the liquid stream inlet.

The foregoing has outlined rather broadly the features and technical advantages of the present invention in order that the detailed description of the various embodiments of the invention which follows can be better understood. Additional features and advantages of the invention which form the subject of the claims of the invention will be described hereinafter.

BRIEF DESCRIPTION OF THE DRAWINGS

The foregoing and other features and aspects of the present invention will be best understood with reference to the following detailed description of a specific embodiment of the invention, when read in conjunction with the accompanying drawings wherein.

DETAILED DESCRIPTION

Figure 1:
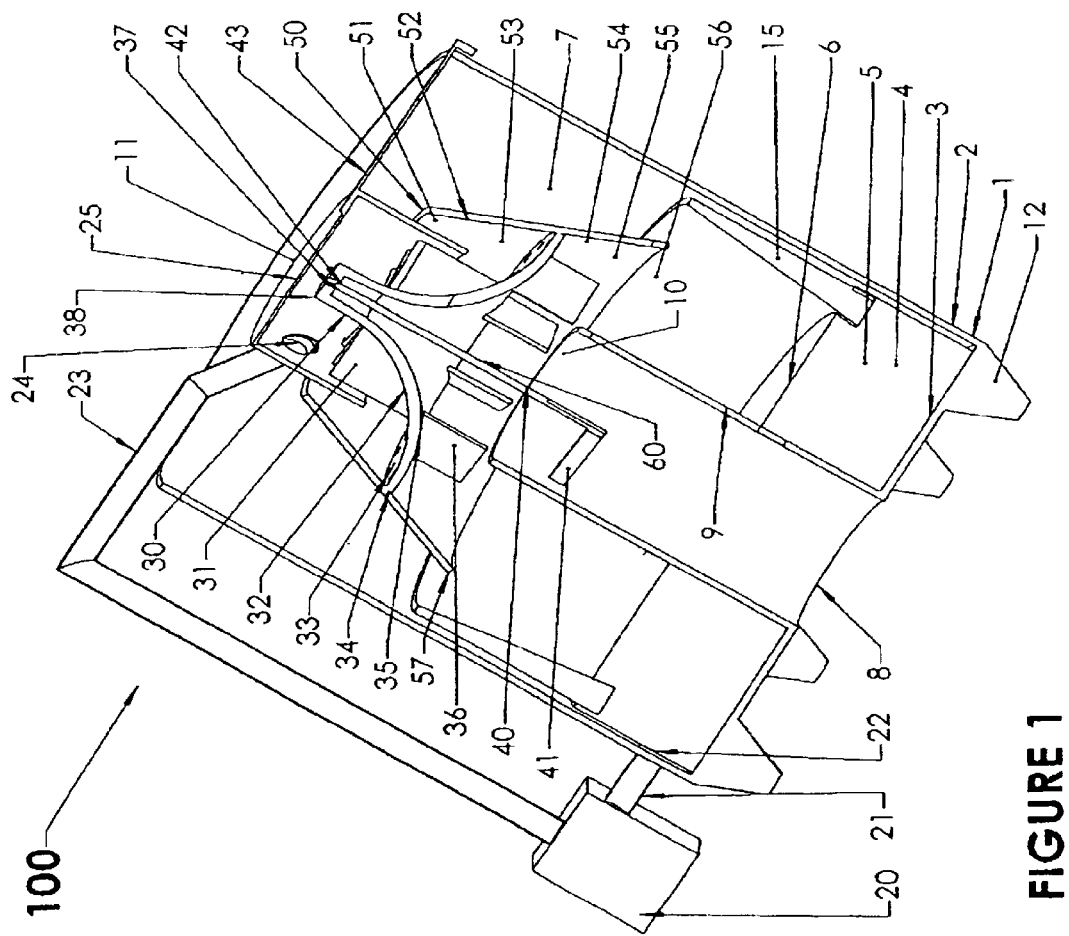
FIG. 1 is a partial cut-away view of a gas scrubber of the present invention.

Refer now to the drawings wherein depicted elements are not necessarily shown to scale and wherein like or similar elements are designated by similar reference numerals in the several Figures.

FIG. 1 is a schematic view of an embodiment of a gas scrubber of the present invention, generally denoted by the numeral 100. Scrubber 100 includes a container 1 having circular side container wall 2 with a bottom wall 3, a top circular outlet opening 11, and a liquid reservoir 4 for holding a liquid 5 having a liquid surface 6. A space 7 is bounded by surface 6, the inside of wall 2, and top opening 11. Space 7 may serve as a cyclone, therefore, space 7 is sometimes referred to as cyclone space 7. Bottom wall 3 is provided with a centrally positioned circular inlet opening 8 that is attached to a circular inlet conduit 9 that extends up through the liquid reservoir and has an outlet opening 10 positioned above surface 6. Leg 12 supports bottom wall 3 a suitable distance above a surface, such as a floor, to provide a passageway for gas to flow below bottom wall 3 to inlet 8.

Scrubber 100 includes a rotatable disk 30 having a top side 32, a bottom side 35, a hub 38, and an outside rim 34. Turbine blades 31 are connected to top side 32 of disk 31 and fan blades 36 are connected to bottom side 35 to rotate therewith. Turbine blades 31 rotate disk 30 when a stream of liquid flows through them and fan blades 36 draw gas through opening (gas inlet) 8 and pump the gas through scrubber 100. Hub 38 includes indentation 37 and is mounted to rotate around axle 60. Axle 60 comprises a rod 40 with a pivot point 42 and support 41 attached to conduit 9. Pivot point 42 may be a bearing.

The mid-portion of cone shaped centrifugal cylinder 50 is attached to the rim 34 of disk 30 to rotate therewith. The top open end 51 of cylinder 50 is smaller than the bottom open end 56 of cylinder 50. Since disk 30 serves as a partition to separate the top inside portion of cylinder 50 from the bottom inside portion of cylinder 50, disk 30 may also be referred to as partition 30. Cylinder 50 provides top zone 53 above the top side 32 of disk 30 and bottom zone 55 below the bottom side 35 of disk 30. Top zone 53 is bounded by the top side 32 of partition 30, the top inside wall 52 of cylinder 50, and the top open end 51 of cylinder 50. Bottom zone 55 is bounded by the bottom side 35 of partition 30, the bottom inside wall 54 of cylinder 50 and the bottom open end 56 of cylinder 50. The rim 34 of disk 30 is provided with notches 33 to provide a liquid passageway from top zone 53 to bottom zone 55. Cylinder 50 is positioned in space 7 to rotate around opening 10 having its larger bottom outlet 56 positioned below fan blades 36 and opening 10 and its smaller top inlet 51 positioned above turbine blades 31.

Scrubber 100 includes a pump 20 having an inlet pipe 21 connected to liquid reservoir 4 at point 22, and an outlet pipe 23 passes through turbine case 25 and has an outlet 24 positioned to discharge liquid tangentially to turbine blades 31.

Case 25 is supported by support 43 attached to container wall 2. Pump 20 is provided to urge liquid to turbine blades 31 to rotate disk 30. The liquid then gravitates through top zone 53 and passageways 33 to bottom zone 55, down the inside bottom wall 54 of cylinder 50 to reservoir 4, cleaning wall 54 and mixing with the gas and cleaning the gas during the process. Only one liquid outlet point 24 is shown to simplify the drawing, however, a manifold having several points for injecting the liquid around the periphery of turbine blades 31 is sometimes desired to better distribute the flow of liquid equally to the turbine blades and through the passageways 33.

In operation, the rotation of the gas flow against the surface of liquid level 6 sometimes causes liquid level 6 to oscillate and cause an undesirable movement of container 1. This can easily be prevented by placing an object, having a lighter density than the liquid, on the liquid surface to float on the liquid surface. Such a flotation object can have many different shapes. Float 15 of FIG. 1 shows one embodiment whereby the top of float 15 extends up to the cylinder outlet 56 to allow the liquid flowing from the cylinder to strike the inside wall of float 15. This sometimes controls the noise made by the flowing liquid. In fact, it has been found that different sounds can be made by varying the density, shape, and roughness of the inside wall of float 15. The sound of the splash and gurgle of the liquid striking the inside wall of float 15 sometimes brings enchantment to the bedroom and creates a sense of tranquility and induces sleep. Also, the reflection of light against the movement of the flowing liquid is sometimes pleasant and welcome.

The operation of scrubber 100 is summarized as follows. Reservoir 4 of container 1 contains liquid 5 having surface 6. Pump 20 pumps liquid 5 through inlet pipe 21 and outlet pipe 23, and discharges it at outlet 24 tangentially across turbine blades 31 to rotate disk 30 with cylinder 50 and fan blades 36. The liquid flows from the turbine blades through top zone 53 and gravitates through passageways 33 to bottom zone 55 forming a thin face of flowing liquid on the inside bottom wall 54 of centrifugal cylinder 50. Fan blades 36, rotating with disk 30, draw gas through conduit inlet 8, conduit 9, and conduit outlet 10 and discharge the gas against the thin face of flowing liquid on the inside wall 54 of centrifugal cylinder 50. The particulates and undesired gases in the gas impacts the thin face of flowing liquid at a high velocity and a high centrifugal force and the flowing liquid absorbs the particulates and undesired gases by liquid wetting of the particulates and absorbing the undesired gases. The liquid, containing the wetted particulates and absorbed gases, being heavier than the gas, flows first off the bottom rim 57 of cylinder 50 to surface 6 and the inside of wall 2 of container 1. This forces the gas to flow over liquid surface 6 and through the liquid stream flowing off rim 57 and mix and clean the gas further. The clean gas flows through cyclone space 7 in a rotational manner and the centrifugal force caused by such rotation forces the free liquid droplets and mist in the gas to coalesce on the inside of wall 2 of container 1 and to gravitate down to liquid reservoir 4.

Accordingly, gas is scrubbed by scrubbing a stream of gas with a liquid stream as it impinges the liquid stream at a high velocity at the discharge of the fan blades, further impacting and centrifugally mingling the heavier parts in the gas stream with a stream of liquid as the mixture flows at a high rotational rate down the inside of a centrifugal cylinder, flowing the gas and liquid mixture at a high velocity across a liquid surface, scrubbing the gas still further by flowing the gas through a high velocity stream of flowing liquid, and finally, centrifugally separating free liquid droplets and wetted particulates in a cyclone before exhausting the scrubbed gas from the scrubber.

Since some of the liquid is vaporized in most cases, and not recovered in the scrubber, scrubber 100 is usually considered as a user of liquid, and mechanisms for supplying makeup liquid is desired. This makeup mechanism may be connected to first liquid reservoir 4 and include a level control mechanism with a supply of liquid. Alternately, a controlled inlet flow with an over flow pipe to maintain the desired surface level 6, connected to reservoir 4, can be provided to allow excess dirty liquid to over flow to drainage. This alternate method of supplying excess makeup liquid assures that the scrubbing liquid is always clean. Both of these methods are well known by those skilled in the art.

Liquid can also be supplied by providing a second liquid reservoir, having a controlled liquid level, connected to the first liquid reservoir. This controlled liquid level may be maintained by a sealed movable container with an outlet opening in its bottom that is submerged beneath the controlled liquid surface as shown in FIG. 2.

Figure 2:
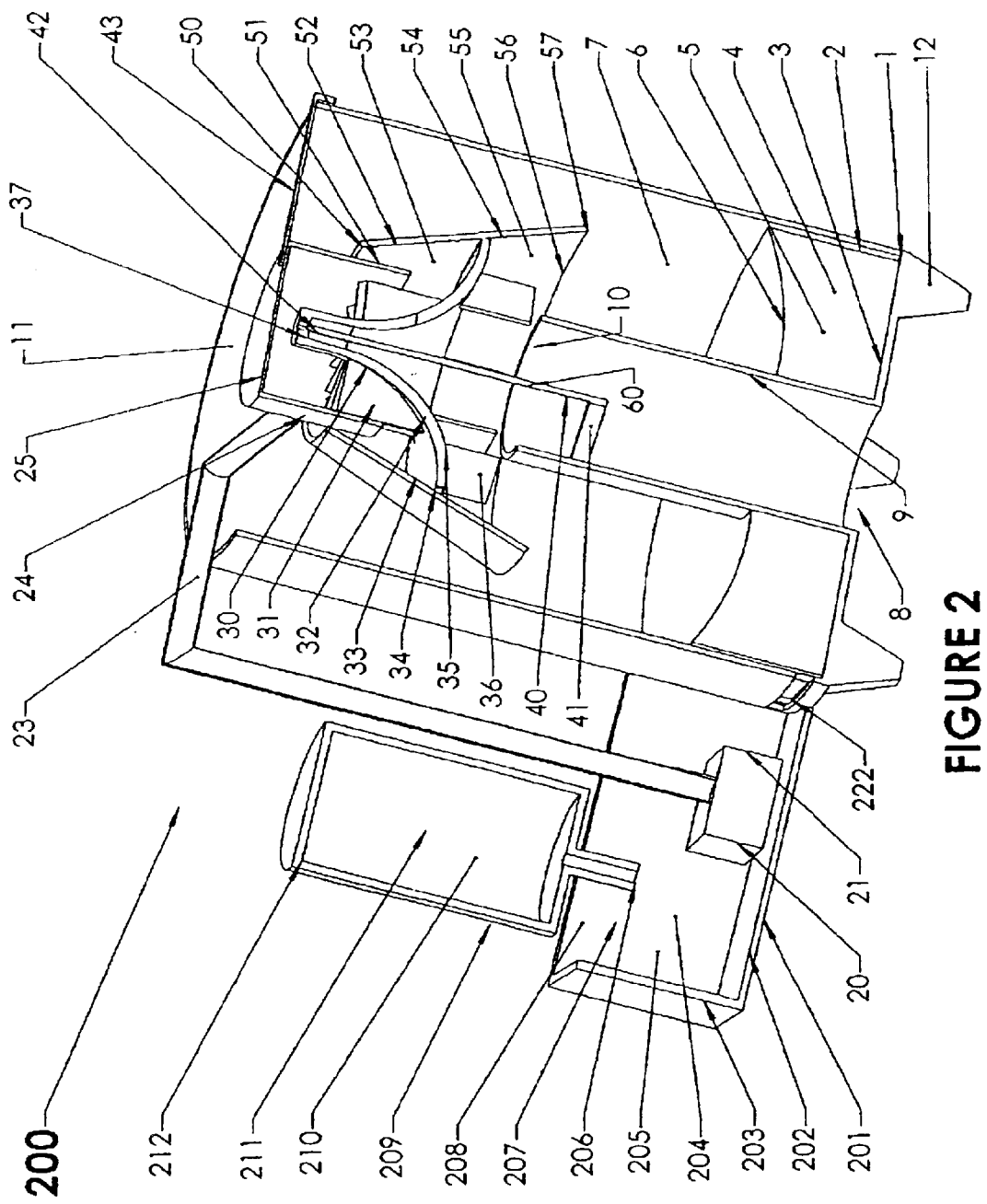
FIG. 2 is a cut-away view of another embodiment of a gas scrubber of the present invention.

FIG. 2 is a schematic view of another embodiment of the gas scrubber of the present invention, generally designated by the numeral 200. Scrubber 200 and its parts with numbers less than 100 are the same parts with the same numbers as those described for scrubber 100. Since they operate the same as those scrubber 100 parts, please refer to the description of FIG. 1 as to operation for these scrubber 200 parts having numbers less than 100. The 200 number parts of scrubber 200 are the new parts that are added to scrubber 100.

Scrubber 200 includes a second container 201 having a side wall 203 and a bottom wall 202 that form a second liquid reservoir 204 for holding liquid 205 having surface 207. Reservoir 204 is in communication with reservoir 4 through opening 222 in wall 2. This allows liquid to flow from reservoir 204 through opening 222 to reservoir 4 to make up liquid losses from first liquid reservoir 4 and to maintain fluid level 6 as desired.

A liquid makeup mechanism, generally designated by the numeral 209, may be connected to container 201 to maintain liquid in second liquid reservoir 204 and thus, liquid in first liquid reservoir 4. An example of a liquid makeup mechanism is a removable bottle 209 having an opening 206 and containing a liquid. Bottle 209 is positioned with opening 206 in fluid communication with opening 208 of container 201. Bottle opening 206 is positioned at the desired liquid level 207 and when the liquid level 207 is lowered beneath bottle opening 206, the vacuum in bottle 209 is broken allowing liquid to flow from bottle 209 to reservoir 204, maintaining level 207 which, in turn, maintains liquid surface 6 at a substantially constant level. Level 207 is maintained by the vacuum above level 211 as balanced by the weight of liquid 210. Other types of liquid makeup mechanisms may be utilized. Pump 20 and inlet 21 is submerged in second liquid reservoir 204, below surface 207 to supply the stream of liquid to disk 30 and operate scrubber 200.

Figure 3:
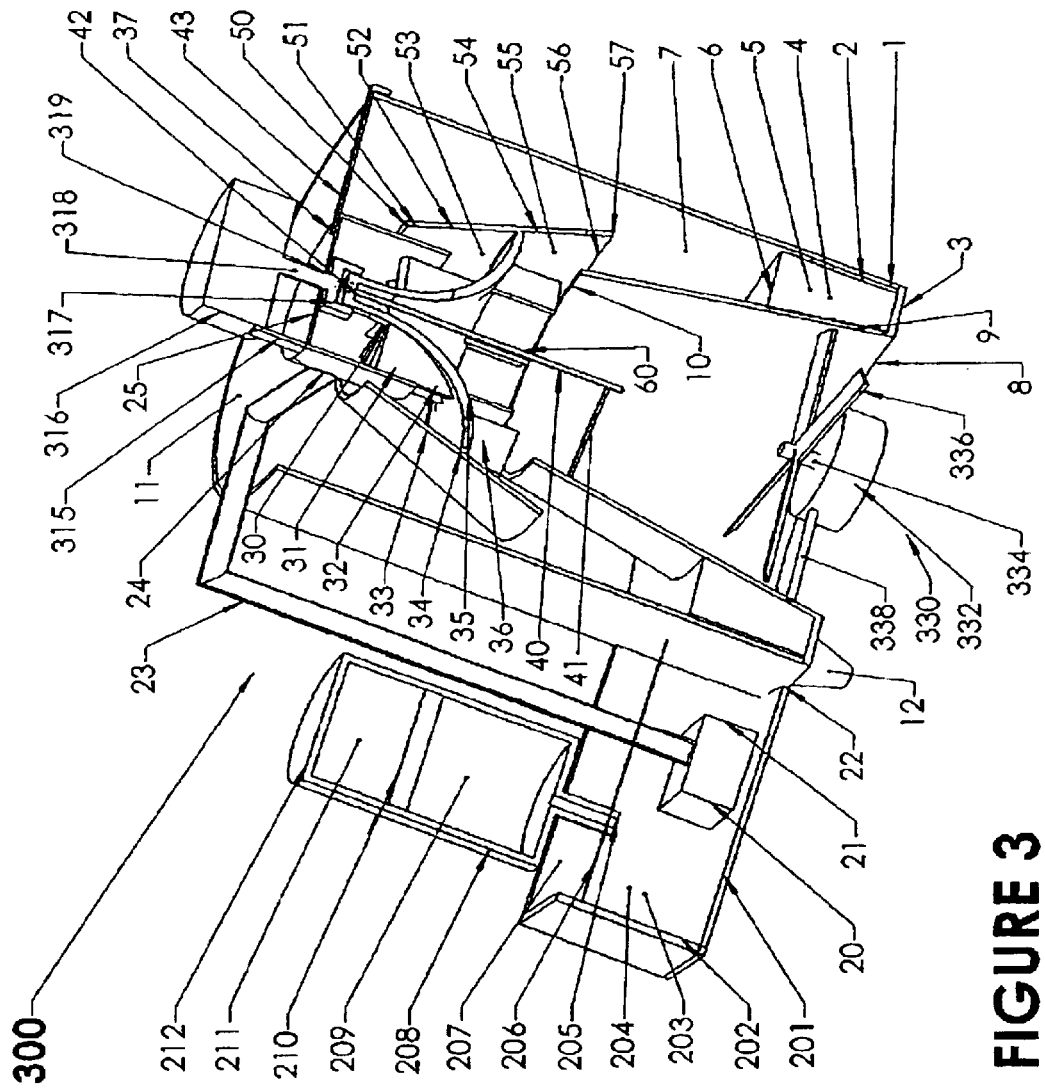
FIG. 3 is a cut-away view of another embodiment of a gas scrubber of the present invention.

It is sometimes desired to increase the capacity and efficiency of the scrubber and this can be done by increasing the size and rotational rate of the fan blades. However, this may require a much larger pump having an excessive and undesirable stream of liquid. This liquid stream may be minimized by adding a small electric motor to the scrubber to assist in rotating the disk. One system for accomplishing this goal is shown by FIG. 3. FIG. 3 also shows how a fan may be optionally added to the scrubber to increase the quantity of gas flow.

FIG. 3 is a schematic drawing of another embodiment of the gas scrubber of the present invention, generally designated by the numeral 300. The new parts of scrubber 300 of FIG. 3 have 300 numbers and include electric motor 316, mounted above pump case 25 by support 315, a drive shaft 318 attached to disk 30, by coupling 317. Shaft 318 passes through the top of case 38 through seal 319. In operation motor 316 rotates shaft 318. This minimizes the liquid flow rate required by pump 20. Motor 316 may also be used to increase the rotational rate of the centrifugal cylinder and thereby increase its efficiency. All of the parts of FIG. 3 having numbers less than 300 operate as described for FIG. 1 and FIG. 2.

Scrubber 300 may further include a fan 330, fan motor 332, drive shaft 334, fan blades 336, and a fan support 338. Fan 330 may optionally be used with or without motor 316, to increase the quantity of gas flowing through scrubber 300. In operation, fan motor 332 drives shaft 334 that rotates blades 336 to pump the gas through conduit 9. Motor 332 is supported by support 338 attached to conduit 9. Although blades 36 are shown as radial blades, they may be curved or propeller shaped, not shown, to allow the increased gas flow of fan 330 to assist in the rotation of the centrifugal cylinder. It has been found that a small motor 316, and/or fan motor 332 may be added to scrubber 300 without significantly increasing the motor noise of the scrubber. Only one leg 12, support 338, and support 315 are shown in FIG. 3 to simplify the drawing, it being understood that additional legs and supports can be added, as required, by one skilled in the art.

Figure 4:
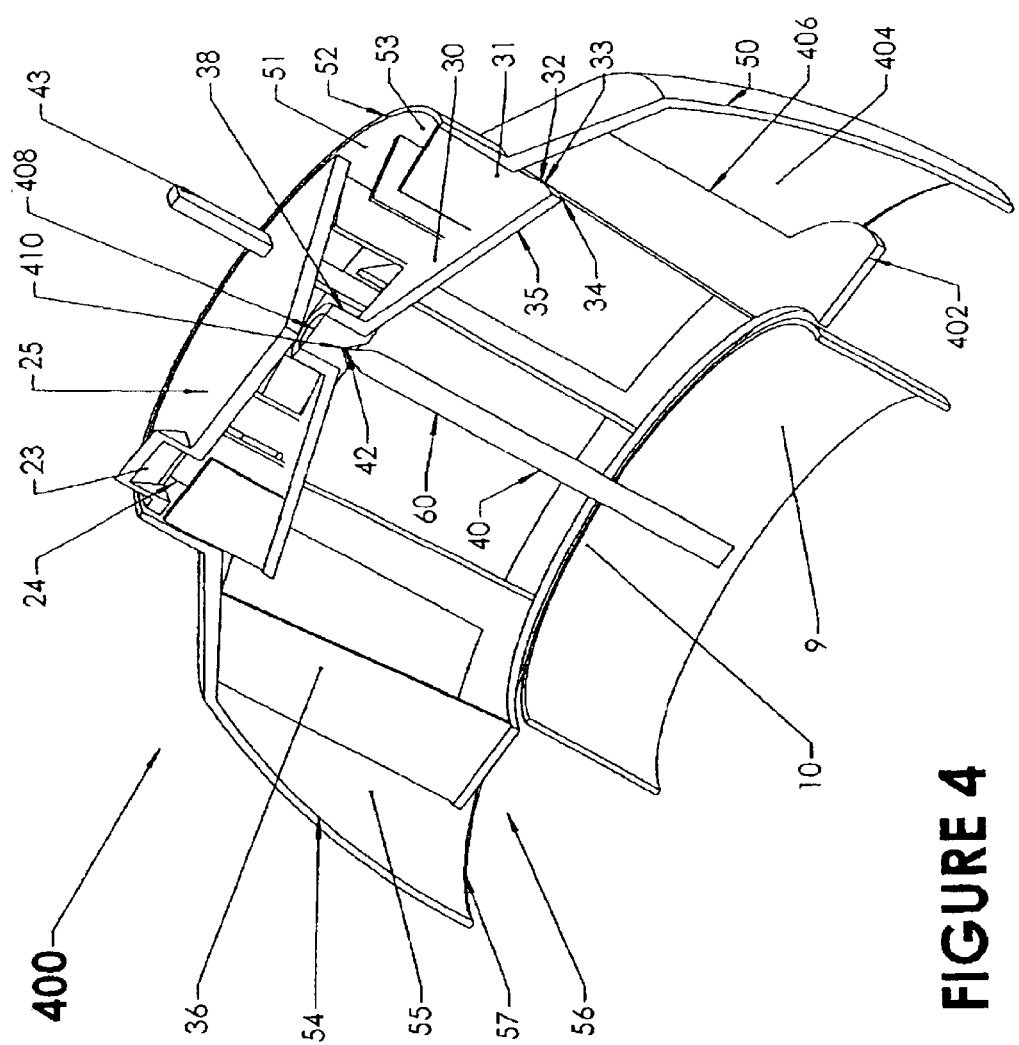
FIG. 4 is a cut-away view of an embodiment of a centrifugal cylinder of the present invention.

FIG. 4 is a schematic view of an embodiment of a centrifugal cylinder, generally denoted by the numeral 400. Centrifugal cylinder 400 is another embodiment of cylinder 50 of FIG. 1. The front half of cylinder 400 in the drawing has been removed so that the internal parts can be seen by the viewer, and the front half and bottom portion of case 25 in the drawing has been removed so that the turbine blades can be better viewed. All of the parts of cylinder 400 with numbers under 400 are the same as the parts of scrubber 100 of FIG. 1, and they operate in the same manner as described above.

It is important, for a small, economical scrubber for home use, that the rotatable parts have minimum weight with minimum friction at the support bearings. This is necessary to obtain maximum rotational rate and gas flow with minimum pump size. To obtain minimum weight, the rotatable parts should be very thin and made of light material, such as plastic. FIG. 4 shows one method of minimizing the friction and wear of the support bearing of scrubber 100. FIG. 4 further shows the top part of support rod 40. Rod tip 42 is also shown. Insert 408, provided with center indentation 410, is inserted in the center of hub 38, as shown. Support point 42 and insert 408 should both be made of hardened steel and point 42 should be sharp, to minimize friction. In this Figure, axle 60 includes rod 40 having a pivot point 42, and hub 30 includes an insert 408.

FIG. 4 also shows an alternate way of attaching the turbine blades 31. In FIG. 1 the turbine blades 31 are attached to disk 30. In FIG. 4 the turbine blades 31 are attached to the inside disk wall 52 and disk 30. So it can be readily seen that the turbine blades 31 can have many shapes and positions. For example, case 25 in FIG. 1 encloses turbine blades 31, but in FIG. 4 case 25 only covers the top of the turbine blades. The main purpose of case 25 is to direct the liquid flow to the turbine blades and the inside of the cylinder and to limit the splashing of the liquid to the outside of the cylinder.

FIG. 4 also shows an alternate way of attaching the fan blades to the cylinder. In FIG. 1 fan blades 36 are attached to disk 30. In FIG. 4 the fan blades 36 are attached to the inside wall 55 of the cylinder and disk 30. Also, fan blades 36 are provided with bottom enclosure 402. Bottom enclosure 402, and the top portion of inside wall 55, that encloses fan blades 36, results in a more efficient fan blade impeller. Please note the space 404 between the outside rim 406 of blades 36 and the outside rim of enclosure 402 and the inside wall 54 of cylinder 50. Space 404 provides a path for the gas and liquid to centrifugally gravitate to the inside curved wall 55 of cylinder 50.

Figure 5:
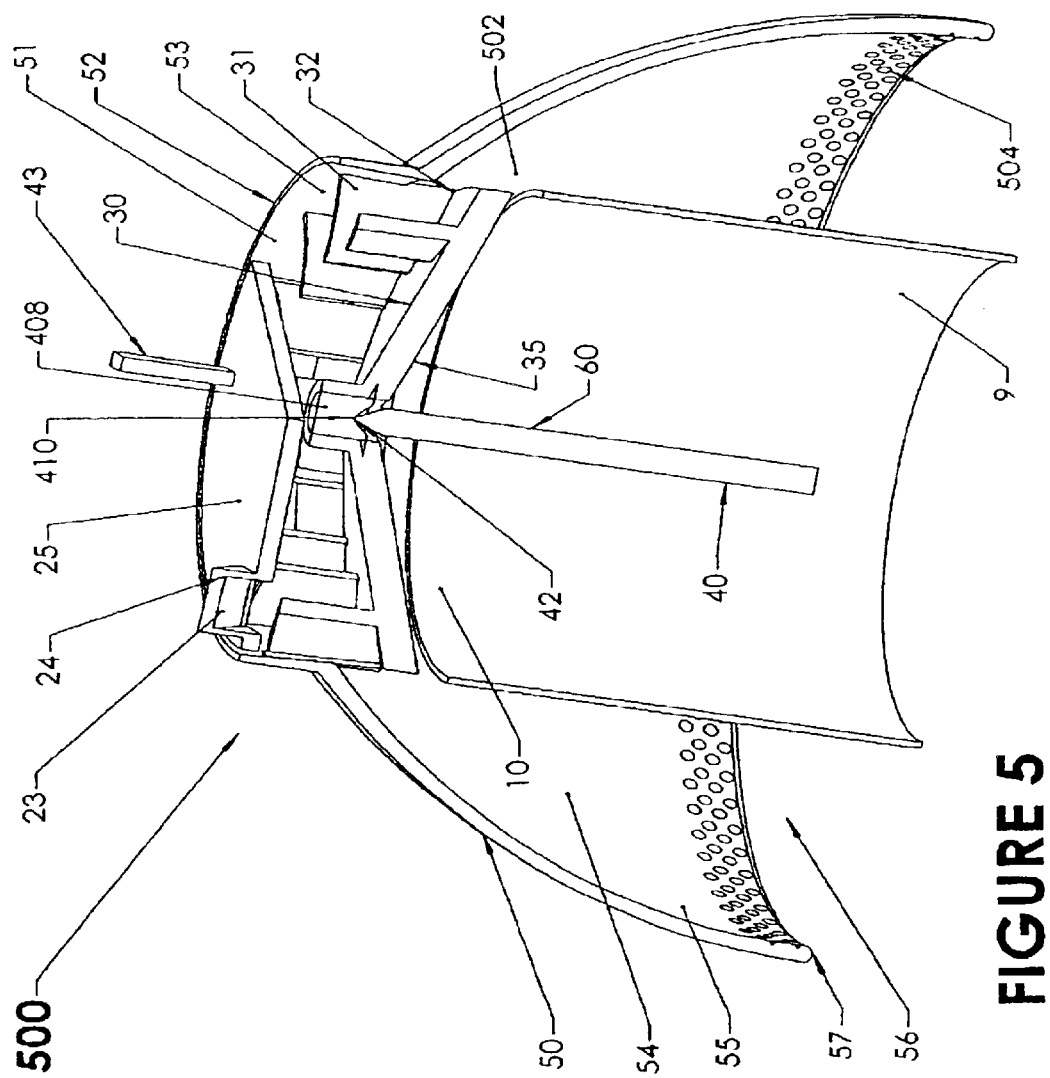
FIG. 5 is a schematic, cut-away view of another embodiment of a centrifugal cylinder of the present invention.

FIG. 5 is a schematic view of another embodiment of a centrifugal cylinder, generally designated by the numeral 500. Various parts and numbers illustrated in FIG. 5, are described in additional detail in FIGS. 1 through 4.

FIG. 5 illustrates a designed shape of turbine blades 31. Turbine blades 31 of cylinder 500 are curved to make them more efficient. It can be seen that turbine blades 31 may have many different shapes and positions, depending mainly on the overall size, liquid flow, and effects desired from the gas scrubber.

Another difference of cylinder 500 from the others is that cylinder 500 has no fan blades. The elimination of the fan blades in cylinder 500 reduces the quantity of gas flow through the cylinder. However, the use of cylinder 500 design results in an economical apparatus suitable for home or domestic use. The inside wall 55 of cylinder 50 of cylinder 500 rotates at a high rotational rate and the liquid face rotates with it causing friction on the gas touching the liquid face. This causes the gas in space 54 to rotate with cylinder 50, increasing the gas velocity and decreasing the gas pressure. This change in gas pressure causes the gas to be drawn through opening 10 and to flow down inside wall 55 and out opening 56 to the outside of cylinder 50. The removal of the fan blades increases the rotational rate of cylinder 50, decreases the liquid flow requirement, and increases the wall 55 area to contact the liquid with the gas. These advantages can be balanced with the disadvantages of a decreased gas flow and the design of the fan blades, if any are used, can be made accordingly.

Another difference of cylinder 500 from the others is that the bottom portion of cylinder 50 of cylinder 500 contains perforations 504. The centrifugal force caused by rotating cylinder 50 on the liquid face flowing down wall 55 causes some of the liquid to flow through holes 504. The aperture of holes 504 is sized such that the liquid flowing through holes 504 also draws some gas with it. This contacts the liquid with the gas that flows through the holes further cleaning that gas. These holes can optionally be used on any of these gas scrubbers.

To clarify the drawing, support 41 supporting rod 40, support 43 supporting case 25, and support 415 supporting motor 416 are not shown in detail. Supports for bottle 412 are not shown. It should be understood that one skilled in the art can readily provide such supports as needed.

FIGS. 1–5 illustrate scrubbers having a gas inlet positioned at the bottom of the scrubber, below the disk. However, it should be noted that the disk may be mounted on a horizontal shaft and the gas inlet may be from the side of the scrubber disk, or the disk may be mounted on a vertical shaft with the gas inlet being positioned above the disk without departing from the scope of the invention. FIG. 6–12 illustrate embodiments of the present invention with the gas inlet positioned above the disk.

Figure 6:
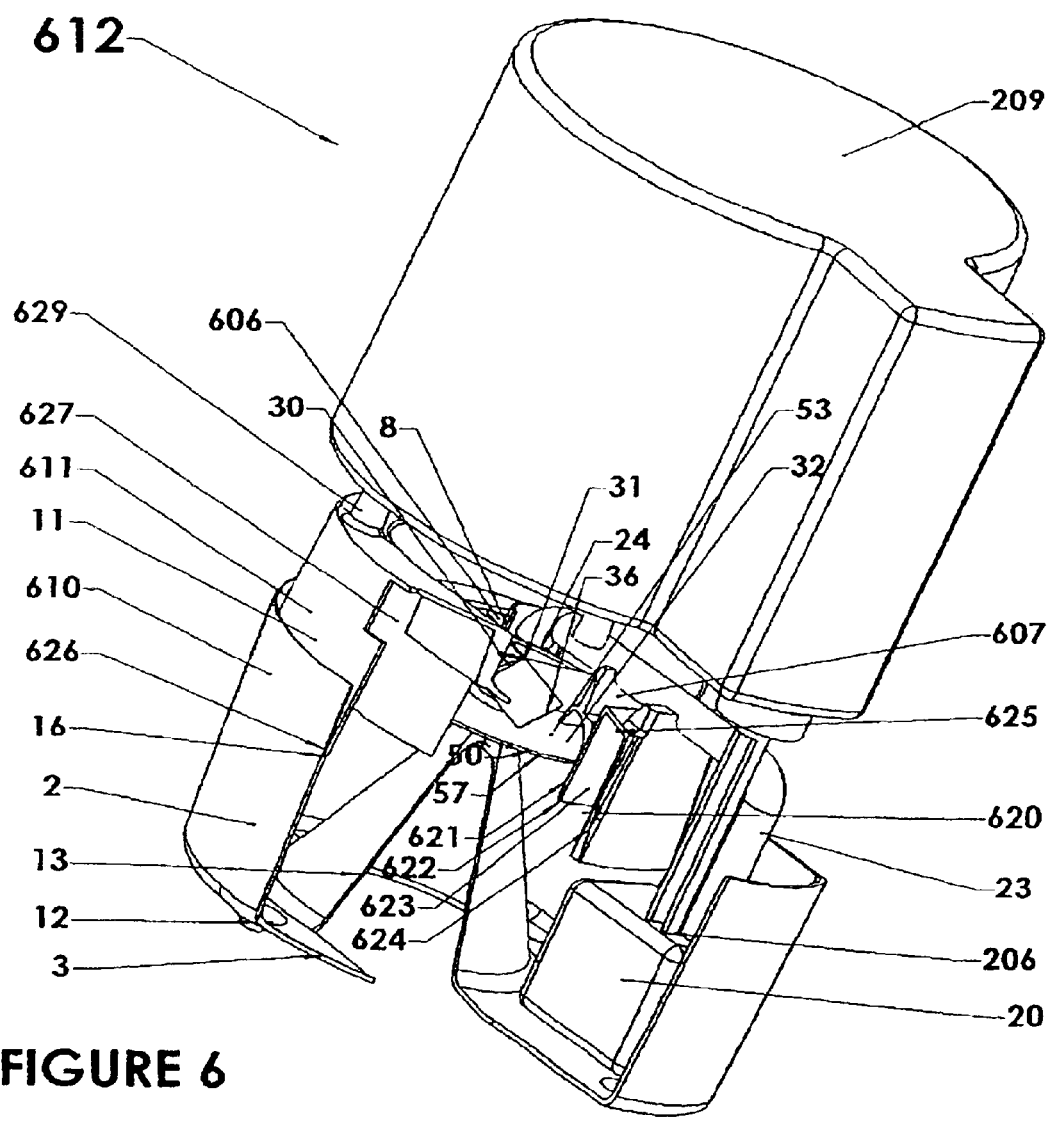
FIG. 6 is a partial, cut-away view of another embodiment of a scrubber of the present invention.

FIG. 6 is a partial, cut-away view of another embodiment of a scrubber of the present invention, generally designated by the numeral 612. Scrubber 612 shows gas inlet 8 positioned above disk assembly 607, as opposed to gas flowing from below the scrubber, as illustrated by the embodiments of FIGS. 1–5. FIG. 6 is described with reference to the more descriptive illustrations of FIGS. 7–12.

Figure 7:
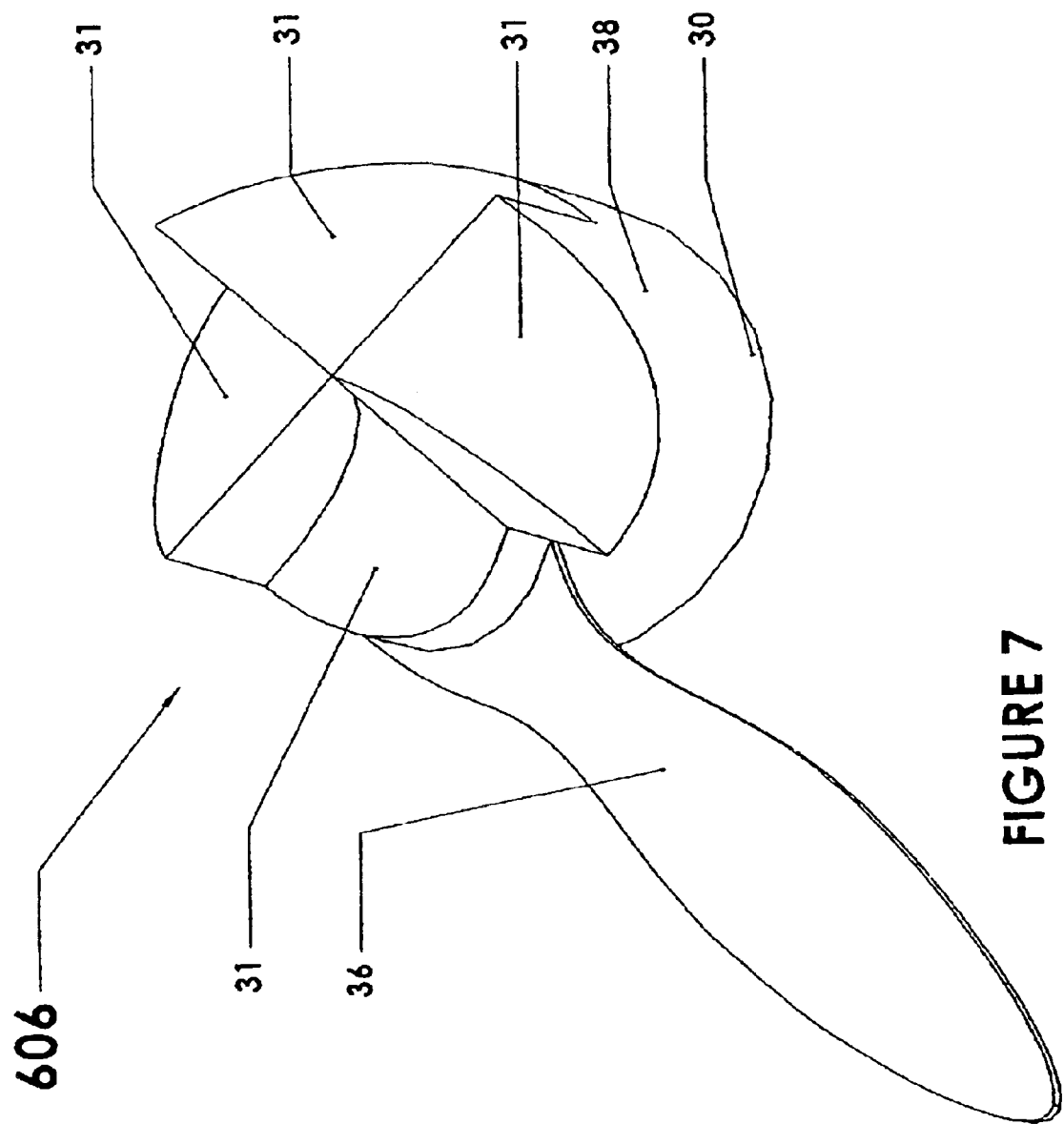
FIG. 7 is a perspective view of the hub assembly of FIG. 6 in isolation.

FIG. 7 is a perspective view of the hub assembly 606 of FIG. 6 in isolation. FIG. 7 illustrates one form of turbine blades 31 and fan blades 36. Disk assembly 606 includes turbine blades 31 (four are shown) centrally mounted on rotatable hub 38, Hub 38 is supported by, and mounted to rotate around, an axle shown in detail in FIG. 9. To simplify the drawing, only one fan blade is shown in the drawing, however it is understood that the shape, positioning, and number of fan blades attached to hub 38 is dictated by the final performance required by the scrubber.

In operation, disk assembly 606, turbine blades 31 rotate by flowing a stream of liquid against turbine blades 31 from above the blades. The flowing liquid stream is not shown in this drawing. The rotating turbine blades rotate disk 30 and fan blade(s) 36 which draws the gas from above fan blade(s) 36 and forces the gas down below fan blade(s) 36.

Figure 8:
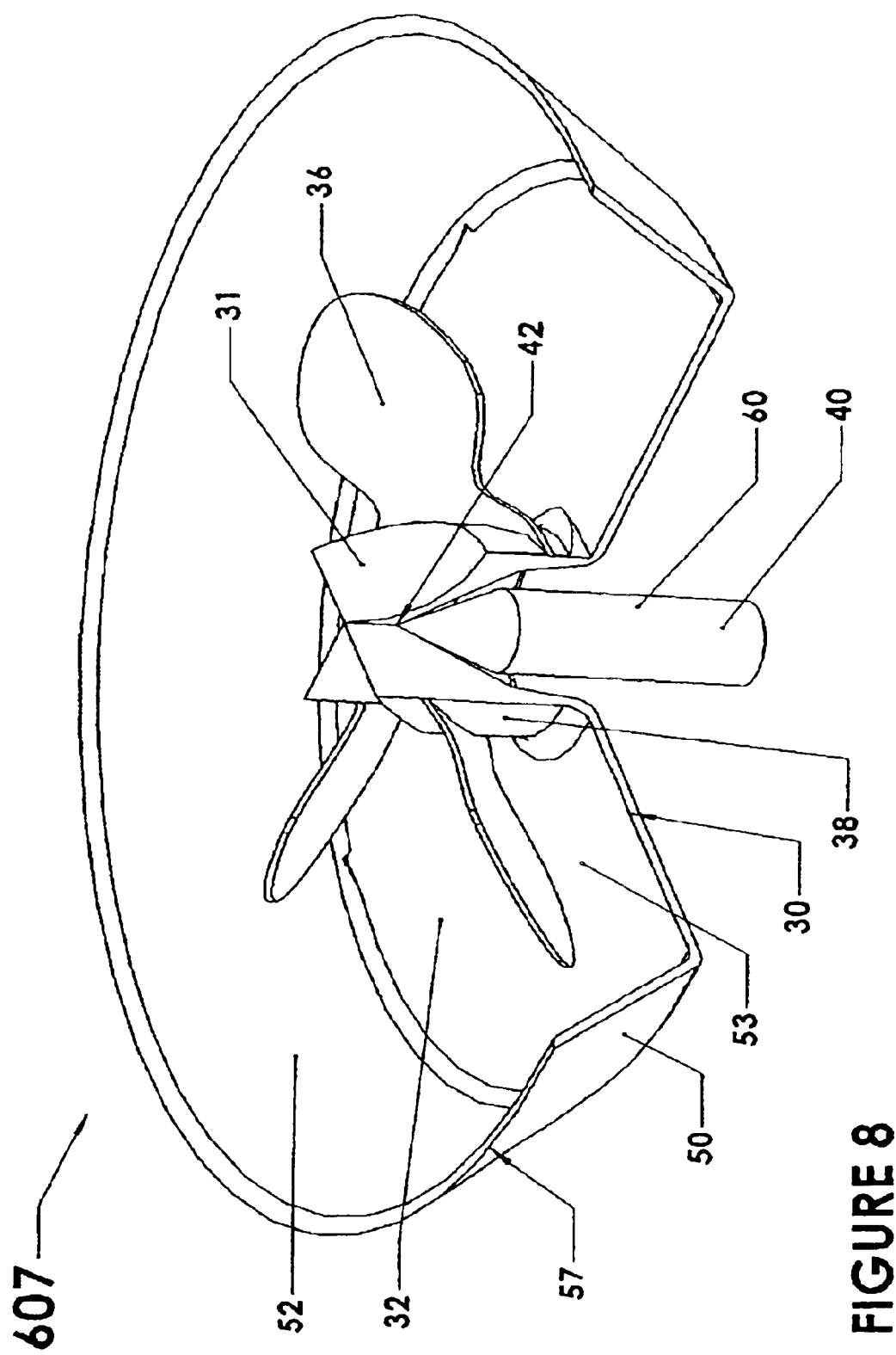
FIG. 8 is a partial, cut-away view of an embodiment of the disk assembly of FIG. 6 in isolation.

FIG. 8 is a partial, cut-away view of an embodiment of disk assembly 607. Disk assembly 607 includes hub 38, turbine blades 31, fan blades 36, and centrifugal cylinder 50 attached to disk 30 to rotate therewith. Cylinder 50 has rim 57, inside wall 52, and disk 30 has a top side 32 that provides space 53 below blades 36 and above wall 32.

In operation, disk assembly 607 of FIG. 8, disk 30, cylinder 50, and fan blades 36 rotate around axle 60 as caused by flowing liquid from above that impacts turbine blades 31. Liquid flowing off turbine blades 31 is centrifugally thrown out and flows through top space 53 along wall 32, as caused by the surface tension of the liquid and the gas forced against it by blades 36, forming a moving liquid surface on wall 32. Blades 36 draw air from above and forces it against the moving liquid surface. The gas and liquid flow from top space 53 along wall 32 and off rim 57. Particulates are separated from the gas as it strikes the liquid surface on wall 32 and by centrifugal force as it flows with the flowing stream of liquid along inside wall 52.

Disk assembly 607 of FIG. 8 includes cylinder 50 to centrifugally separate particulates from the gas stream. However, it has been found that eliminating cylinder 50 allows disk 30 to rotate at a faster rate with a smaller stream of liquid. This faster rotational rate allows fan blades 36 to pump more air. Increasing the air flow by eliminating cylinder 50 may result in a less efficient scrubber, but it is more desirable in some instances.

Figure 9:
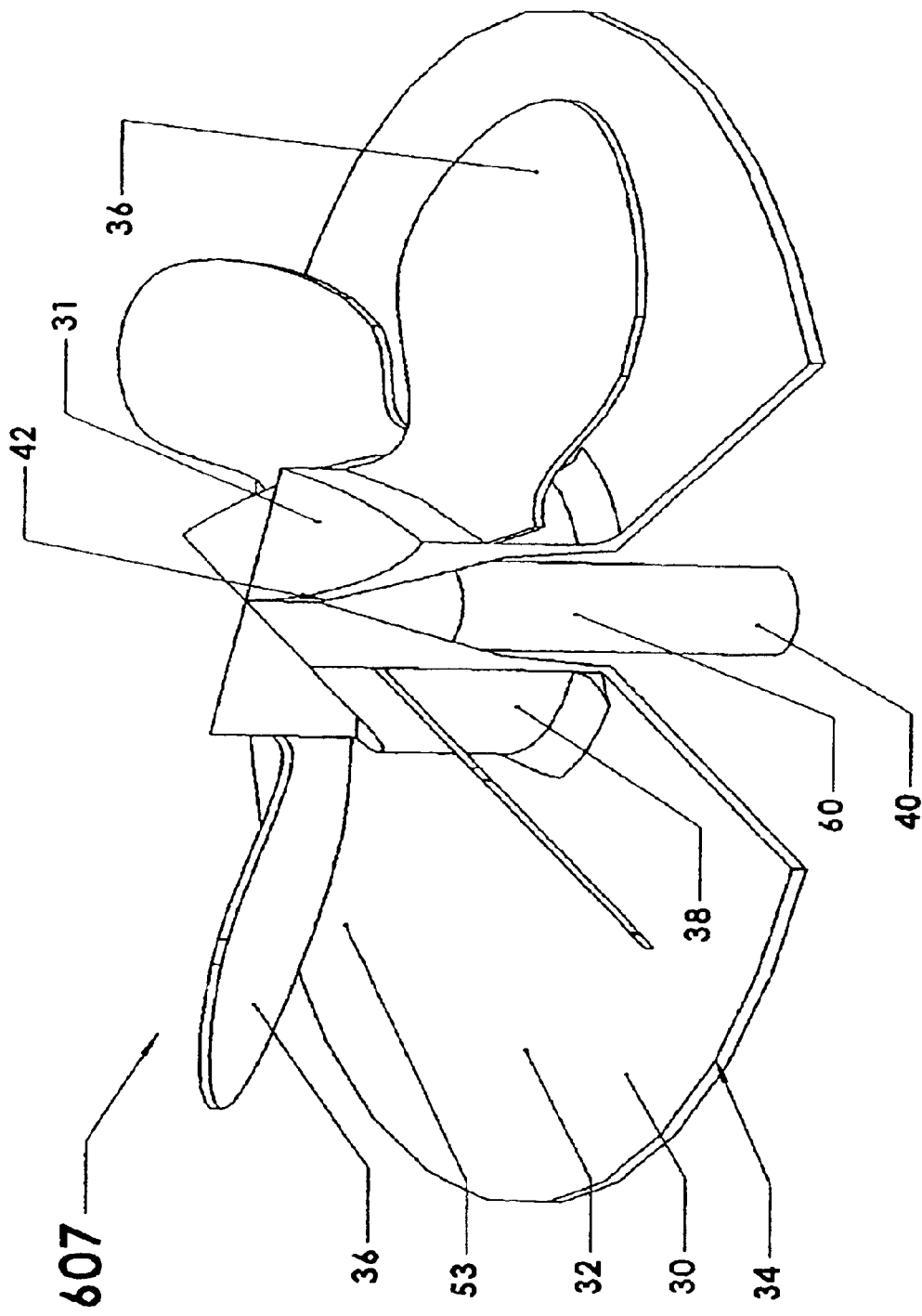
FIG. 9 is a perspective view of another embodiment of the disk assembly of FIG. 6, in isolation.

FIG. 9 is a perspective view of another embodiment of disk assembly 607 of the present invention, in isolation. Disk assembly 607 includes disk 30 having a rim 34 and hub 38, fan blades 36, and a space 53 formed below blades 36 and above wall 32. Disk assembly 607 of this embodiment doe not include a centrifugal wall (sidewall) as shown in FIG. 8.

In operation, disk assembly 607 of FIG. 9, disk 30, and fan blades 36 rotate around axle 60 as caused by impacting liquid from above into turbine blades 31. Liquid flowing off turbine blades 31 is centrifugally thrown out and flows through top space 53, along wall 32 as caused by the surface tension of the liquid on wall 54 and the gas forced against it by blades 36 forming a moving liquid surface on wall 54. Fan blades 36 draw gas from above and forces it against the liquid surface on wall 32. The gas and liquid flows from top space 53 along wall 32 and off rim 34. Particulates are separated from the gas as it strikes the moving liquid surface along wall 32.

FIGS. 7–9 show the turbine blades as separate from the fan blades. This is because the degree of pitch and shape of the turbine blades may differ from the fan blades. The rotational rate of the fan blades is dependant on the velocity that the liquid strikes the turbine blades, the degree of pitch of the turbine blades, and the distance that the turbine blades are from the center of rotation. However, the turbine blades can have the same pitch as the fan blades, or the fan blades can have a variable pitch, so the turbine blades can be the same blades as the fan blades and the liquid can strike any part of the fan blades desired.

Figure 10:
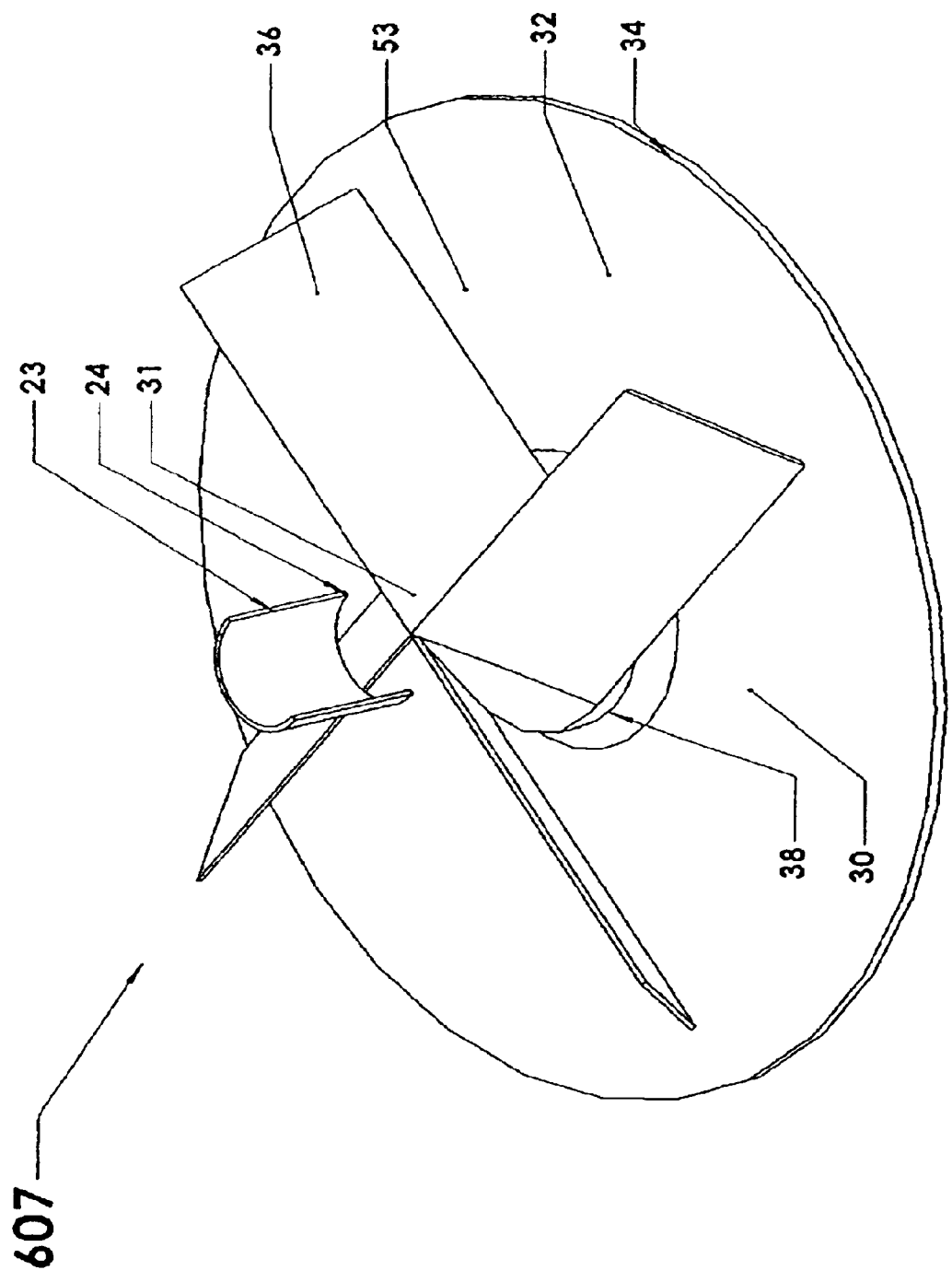
FIG. 10 is a perspective view of another embodiment of the disk assembly of the present invention, in isolation.

FIG. 10 is a perspective view of another embodiment of disk assembly 607 of the present invention, in isolation. As shown, turbine blades 31 and fan blades 36 are the same blade. More specifically turbine blades 31 are an interior portion of the blade proximate hub 38 and fan blades 36 are the distal portion of the blade from the turbine blade end.

A part of liquid discharge pipe 23 and liquid outlet 24 are shown centrally positioned above hub 30. A liquid stream from liquid outlet 24 impacts turbine fan 31 portion of the blades. The liquid stream impacting turbine portion 31 of the blades rotates the blades. The fan blade portion 36, the middle and distal end portions of the blade, draws air in and impacts the air against the liquid surface on wall 32.

Figure 11:
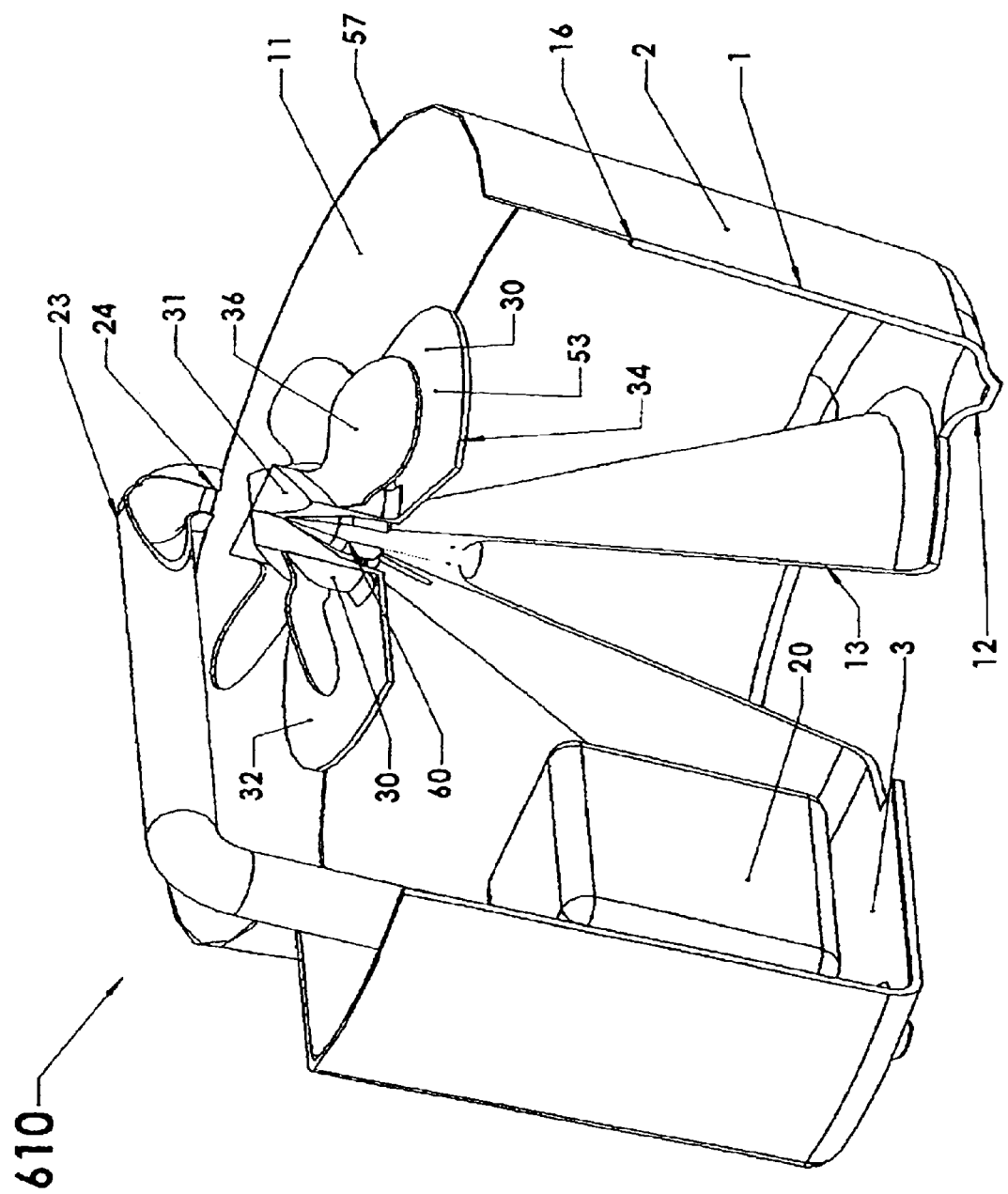
FIG. 11 is a partial, cut-away view of a container assembly of the present invention, in isolation.

FIG. 11 is a partial, cut-away view of a container assembly 610 of the present invention, in isolation. Container assembly 610 includes container 1 having side wall 2, bottom wall 3, a top outlet opening 11, legs 12, pedestal 13 to support axle 60, and support ridge 16 to support top assembly 611 shown in FIGS. 6 and 12. The drawing also shows pump 20 having discharge pipe 23 with outlet nozzle 24 centrally positioned above turbine blades 31. Container assembly 610 holds the liquid used to operate scrubber 612 (FIG. 6). Pump 20 is submerged in the liquid with the pump inlet (not shown) positioned below the liquid surface. The liquid and liquid surface are not shown in FIG. 11, but the liquid surface should be positioned above ledge support 16 and above the inlet suction of pump 20.

In operation, liquid is placed in container I with a surface above support ridge 16 and the inlet of pump 20. This surface is below disk 30 in order to provide a space above the liquid surface and below disk 30. Pump 20 pumps liquid through outlet pipe 23 and out outlet 24 against turbine blades 31. This rotates hub 38, disk 30 and blades 36. The rotating fan blades 36 draw gas from above and forces it against the surface of the flowing liquid stream flowing from turbine blades 31. The flowing gas stream impacts the moving liquid surface on wall 32 and particulates in the gas stream are absorbed by the liquid stream.

The above operation of container assembly 610 of FIG. 11 is described using the disk 30 shown in FIG. 10. However, if cylinder 50 of FIG. 8, having inside centrifugal wall 52, is used, particulates are also centrifugally separated as the gas flows against the liquid stream flowing along wall 52.

Figure 12:
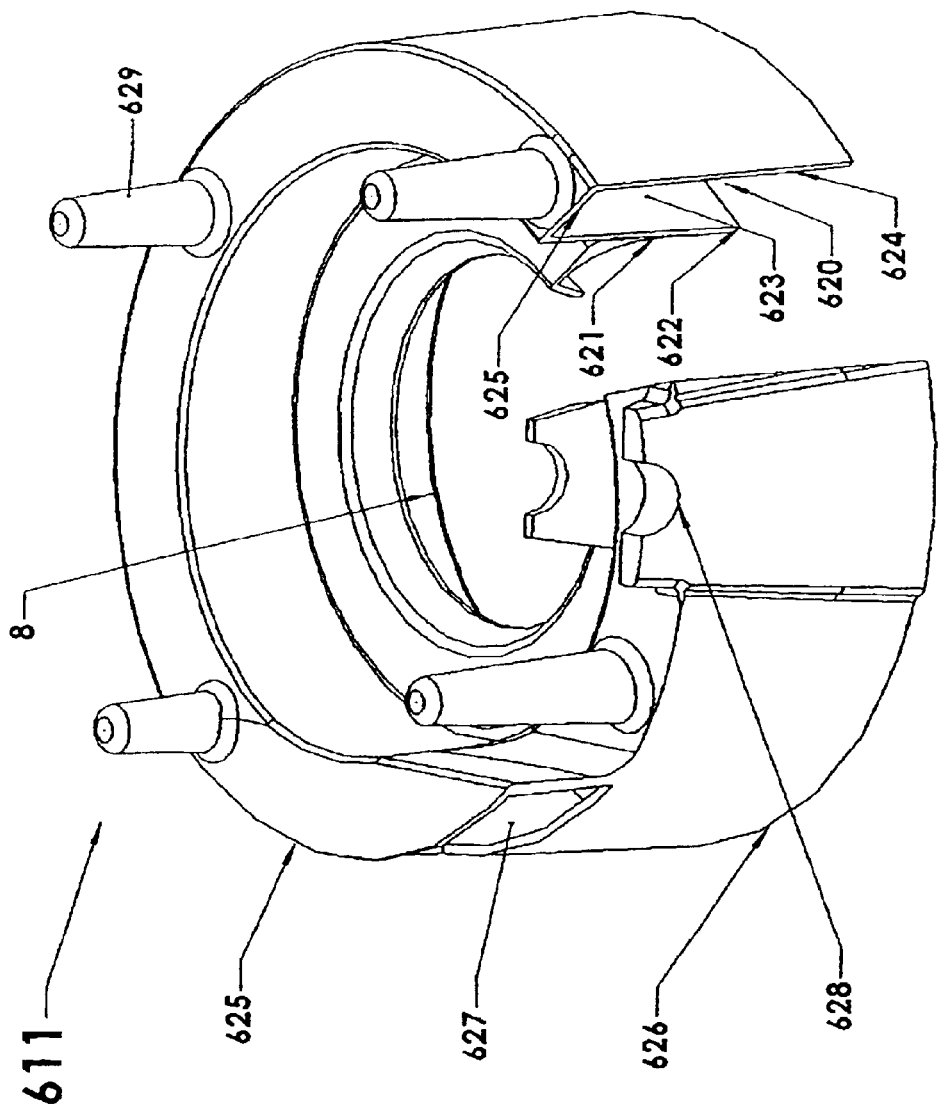
FIG. 12 is a partial, cut-away view of a top container assembly of the present invention.

FIG. 12 is a partial, cut-away view of the top container assembly 611 that fits on the bottom container assembly 610 of FIGS. 11 and 6. Bottom rim 626 of top assembly 611 fits down in opening 11 of container assembly 610 (FIG. 11) and is supported by ledge 16 of container assembly 610. Top assembly 611 includes gas discharge channel 620 having an inlet face 621, an inlet bottom rim 622, inside side faces 623 and 624, inside top helical wall 625, bottom support rim 626, and outlet 627.

Disk 30 with fan blades 36 of FIGS. 8, 9, or 10 (not shown in FIG. 12) are positioned below gas inlet 8. Supports 628 of top assembly 611 support discharge pipe 23 of container assembly 610 (FIG. 11). Supports 629 supports the reserve liquid reservoir 209 (FIG. 6).

Operation of top assembly 611 is described with reference to FIGS. 8–12. Gas is drawn through gas inlet 8 by fan blades 36 and the gas and liquid stream off of fan blades 36 and disk 30 and strike the face 621. The liquid flows down inside face 621, around rim 622 to channel 620 and inside face 624, and then gravitates down face 624 to the liquid reservoir in container assembly 610. The gas is scrubbed as it flows through the liquid stream, after leaving disk 30, and again as it flows down face 621 with the liquid. Then it is scrubbed further when flowing back through the flowing liquid to channel 620, after flowing around rim 622. Free liquid droplets are centrifugally impacted against inside wall 624 when the gas flows inside and around channel 620, where they coalesce and gravitate down to the liquid reservoir below. The gas then flows inside channel 620, as bounded by the liquid surface in container assembly 610, inside walls 623 and 624, helical top 625, and out outlet 627.

In FIG. 6, container assembly 610 is filled with liquid to a surface above the inlet of pump 20 and rim 626. Outlet 206 is positioned at this desired liquid surface level and this surface level is maintained by a liquid supply from part 209. Pump 20 pumps liquid through discharge pipe 23 and out outlet 24 which is centrally positioned above turbine blades 31, or near the hub of fan blades 36 This flowing liquid against turbine blades 31 causes disk 30 to rotate with fan blades 36. The rotating fan blades draw gas through gas inlet 8 and the gas and liquid flows through space 53 against disk wall 32 and off rim 34 to inside wall 621. The gas and liquid flows down inside wall 621, around rim 622, and into channel 620 where it rotates in a helical spiral direction and out outlet 627.

The type of liquid used in these scrubbers depends on the type of gas being scrubbed, the gas temperature, and the results required. If a high temperature gas, or a hydrocarbon gas, is being scrubbed, a light oil is preferred. A light oil may sometimes be preferred with air, in order to minimize evaporation. If the objective of the scrubber is only to remove particulates from the air in a home, tap, bottled or distilled water may be preferred. However, if the objective of the scrubber is to deodorize the air or to sterilize the air and/or the surrounding area, then a disinfectant or deodorizer could be added to the water. A disinfectant added to the water used with the present invention allows the disinfectant to vaporize with the water and fumigates the air and surrounding objects that it contacts. A propylene glycol ($CH_2CH(OH)CH_2OH$) added to the water of the present invention makes an excellent disinfectant and since it is soluble in oil, it is good to remove cigarette smoke from the air in a home. It sterilizes the air and water that it comes in contact with and since it boils at 371° F., it will not vaporize with the water as readily. Hydrogen peroxide ($H_2O_2$) is also an excellent disinfectant if added to the water of the present invention. It sterilizes the air and water that it comes in contact with and is more readily vaporized than propylene glycol since it boils at 306° F. Water containing 1% to 5% hydrogen peroxide is good when used with a scrubber of the present invention in a room containing undesirable virus, bacteria, and spores. Ethanol ($CH_3CH_2OH$), which boils at 173° F., vaporizes readily when it is used with water in the present invention. It sterilizes the air and water that it comes in contact with and its vapors sterilize the air and objects that it contacts, so, ethanol could be used as a fumigating disinfectant. The ethanol in fumes that are breathed by humans is absorbed by the blood in the lungs, so a little amount of ethanol added to the water of a scrubber of the present invention is sometimes desirable since in addition to removing particulates from the air and sterilizing the air and objects that it contacts, a person breathing this clean sterilized air containing ethanol may have a sense of well being. The scrubber may also be utilized as a deodorizer or fumigator by adding a deodorant or disinfectant to the water.

When using the scrubber with water, the scrubber may be used as a humidifier due to the evaporation of the scrubber water.

From the foregoing detailed description of specific embodiments of the invention, it should be apparent that a method and apparatus for cleaning a gas that is novel and non-obvious has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations that may have been suggested herein, may be made to the disclosed embodiments without departing from the scope and spirit of the invention as defined by the appended claims which follow.

What is claimed is:

1. An apparatus for removing particulates from a gas stream with a liquid stream, the apparatus comprising:
   a container having a top opening, the container forming a bottom space and a top space;
   a reservoir of liquid disposed in the bottom space;
   a rotatable disk;
   turbine blades connected to the disk;
   fan blades connected to the disk; and
   a pump in fluid connection with the liquid reservoir for discharging a liquid stream toward the turbine blades;
   wherein the liquid stream impinges the turbine blades rotating the disk and the fan blades, the liquid stream forms a flowing liquid surface along a portion of the disk and into the liquid reservoir, and the rotating fan blades draw a gas stream into the container and discharge the gas stream against the flowing liquid surface scrubbing the gas and the cleaned gas circulates through the top space and exits the top opening in the container.

2. The apparatus of claim 1, further including:
   a space formed between the bottom of the fan blades and a top side of the disk for flowing the gas streams and the liquid stream therethrough.

3. The apparatus of claim 1, further including:
   a motor connected to the disk to assist in the rotation of the disk.

4. The apparatus of claim 1, further including:
a motorized fan positioned proximate a gas inlet of the container for drawing gas into the container.

5. The apparatus of claim 1, further including:
a liquid makeup mechanism in connection with the liquid reservoir.

6. The apparatus of claim 1, wherein each turbine blade is a portion of one of the fan blades.

7. An apparatus for removing particulates from a gas stream with a liquid stream, the apparatus comprising:
a container having a top opening, the container forming a bottom space and a top space;
a reservoir of liquid disposed in the bottom space;
a rotatable disk;
fan blades connected to the disk;
turbine blades connected to the disk, wherein each turbine blade is a portion of one of the fan blades;
a space formed between the bottom of the fan blades and a top side of the disk;
a pump in fluid connection with the liquid reservoir for discharging a liquid stream toward the turbine blades; and
liquid makeup mechanism in connection with the liquid reservoir;
wherein the liquid stream impinges the turbine blades rotating the disk and the fan blades, the liquid stream forms a flowing liquid surface along a portion of the disk and into the liquid reservoir, and the rotating fan blades draw a gas stream into the container and discharge the gas stream against the flowing liquid surface scrubbing the gas and the cleaned gas circulates through the top space and exits the top opening in the container.

8. The apparatus of claim 7, further including:
a motor connected to the disk to assist in the rotation of the disk.

9. The apparatus of claim 7, further including:
a motorized fan positioned proximate a gas inlet of the container for drawing gas into the container.

10. The apparatus of claim 8, further including:
a motorized fan positioned proximate a gas inlet of the container for drawing gas into the container.

11. An apparatus for removing particulates from a gas stream with a liquid stream, the apparatus comprising:
a container having a top opening, the container forming a bottom space and a top space;
a reservoir of liquid disposed in the bottom space;
a rotatable disk positioned in the top space;
a cylinder connected to the disk to rotate therewith;
turbine blades connected to the disk;
fan blades connected to the disk; and
a pump in fluid connection with the liquid reservoir for discharging a liquid stream toward the turbine blades;
wherein the liquid stream impinges the turbine blades rotating the disk, cylinder and the fan blades, the liquid stream forms a flowing liquid surface along a inside wall of the cylinder and into the liquid reservoir, and the rotating fan blades draw a gas stream into the container and discharge the gas stream against the flowing liquid surface scrubbing the gas and the cleaned gas circulates through the top space and exits the top opening in the container.

12. The apparatus of claim 11, further including:
holes formed through a portion of the cylinder.

13. The apparatus of claim 11, further including:
forming a flowing liquid surface along a portion of the disk.

14. The apparatus of claim 11, further including:
a motor connected to the disk to assist in the rotation of the disk.

15. The apparatus of claim 11, further including:
a motorized fan positioned proximate a gas inlet of the container for drawing gas into the container.

16. The apparatus of claim 11, further including:
a liquid makeup mechanism in connection with the liquid reservoir.

17. The apparatus of claim 11, wherein each turbine blade is a portion of one of the fan blades.

18. The apparatus of claim 11, wherein the turbine blades are connected to a top side of the disk and the fan blades are connected to a bottom side of the disk.

19. An apparatus for removing particulates from a gas stream with a liquid stream, the apparatus comprising:
a container having a top opening, the container forming a bottom space and a top space;
a reservoir of liquid disposed in the bottom space;
a rotatable disk positioned in the top space;
a cylinder connected to the disk to rotate therewith, the cylinder having holes formed through a portion thereof;
turbine blades connected to the disk;
fan blades connected to the disk; and
a pump in fluid connection with the liquid reservoir for discharging a liquid stream toward the turbine blades;
wherein the liquid stream impinges the turbine blades rotating the disk, cylinder and the fan blades, the liquid stream forms a flowing liquid surface along a inside wall of the cylinder and a portion of the disk and into the liquid reservoir, and the rotating fan blades draw a gas stream into the container and discharge the gas stream against the flowing liquid surface scrubbing the gas and the cleaned gas circulates through the top space and exits the top opening in the container.

20. The apparatus of claim 19, further including:
a motor connected to the disk to assist in the rotation of the disk.

21. The apparatus of claim 19, further including:
a motorized fan positioned proximate a gas inlet of the container for drawing gas into the container.

22. The apparatus of claim 19, further including:
a liquid makeup mechanism in connection with the liquid reservoir.

23. The apparatus of claim 19, wherein each turbine blade is a portion of one of the fan blades.

24. The apparatus of claim 19, wherein the turbine blades are connected to a top side of the disk and the fan blades are connected to a bottom side of the disk.

25. A method of scrubbing a gas, the method comprising the steps of:
discharging a liquid stream against a turbine blade to rotate a fan blade and a disk;
forming a flowing liquid surface across a portion of the disk;
scrubbing the gas by impacting a gas stream against the flowing liquid surface across the disk; and
discharging the scrubbed gas stream.

26. The method of claim 25, further including the steps of:
forming a flowing liquid surface across an inside wall of a cylinder; and scrubbing the gas by impacting the gas stream against the flowing liquid surface across the cylinder wall.

* * * * *